United States Patent [19]

Bianchini et al.

[11] Patent Number: 5,031,748
[45] Date of Patent: Jul. 16, 1991

[54] APPARATUS FOR FEEDING CLOSURES EQUIPPED WITH A TUBE TO AN OPERATING UNIT

[75] Inventors: Ivo Bianchini; Carlo Corniani, both of Marmirolo, Italy

[73] Assignee: Azionaria Costruzioni Macchine Automatiche A.C.M.A. S.p.A., Bologna, Italy

[21] Appl. No.: 541,681

[22] Filed: Jun. 21, 1990

[30] Foreign Application Priority Data

Jun. 30, 1989 [IT] Italy .................... 3532 A/89
May 9, 1990 [IT] Italy .................... 3497 A/90

[51] Int. Cl.⁵ ............................ B65G 47/24
[52] U.S. Cl. .................... 198/380; 198/392; 198/493
[58] Field of Search ............ 198/380, 392, 493; 221/157, 160, 167, 278

[56] References Cited

U.S. PATENT DOCUMENTS

| 2,631,714 | 3/1953 | McCain | 198/392 |
| 3,326,350 | 6/1967 | Cromer et al. | 198/380 |
| 3,407,964 | 10/1968 | Wysocki et al. | 221/167 |
| 4,610,345 | 9/1986 | Spreen et al. | 198/392 |
| 4,709,798 | 12/1987 | Herzog | 198/392 |

Primary Examiner—Joseph E. Valenza
Attorney, Agent, or Firm—Guido Modiano; Albert Josif

[57] ABSTRACT

The apparatus for feeding closures provided with a tube to an operating unit, has a rotatable disk-like body, having a substantially vertical axis and a fixed or movable wall which delimits the body peripherally. The disk-like body has a circular supporting wall which is permeable to air at an outer annular portion, and is provided with a peripheral annular track adapted to accommodate closures arranged with their tubes directed upward. A pump is provided and arranged below the supporting wall to direct a jet of air with a substantially vertical direction toward a portion of the lower surface of the supporting wall so as to lift the closures from the circular supporting wall and push them toward the peripheral annular track from which closures exit through a passage defined in the wall which delimits the disk-like body.

14 Claims, 4 Drawing Sheets

APPARATUS FOR FEEDING CLOSURES EQUIPPED WITH A TUBE TO AN OPERATING UNIT

BACKGROUND OF THE INVENTION

The present invention relates to an apparatus for feeding closures provided with a tube to an operating unit.

In particular, the present invention relates to an apparatus suitable for feeding, according to a preset arrangement, closures provided with a tube to the closure-fitting unit of a machine for filling containers with liquid products.

As known, containers are used for liquid products which are upwardly closed by a closure which is provided with a dispenser apparatus such as a spraying mechanism and is provided, in a downward position, with a tube for drawing the liquid contained in said container. Such containers are considerably widespread on the market.

Said closures are applied to their respective containers by a closure-fitting unit to which said closures are fed in succession by means of a feeder apparatus which receives the closures at random and arranges them uniformly so that they can be guided in an orderly and appropriate manner to the closure-fitting unit.

An apparatus of this kind is known which essentially comprises a rotary disk-like conveyor on a central region whereof the closures are fed at random. Said rotary conveyor is peripherally flanked by a fixed shield and has a plurality of mutually equidistant peripheral recesses into which the closures, under the action of centrifugal force, are caused to become arranged with their tube arranged upward.

In this kind of apparatus, the closures can enter the recesses only by virtue of random movements of said closures during their disorderly movement on the rotary conveyor, and said entry is rendered considerably difficult and problematical, since random movements rarely occur in such a manner as to arrange the tubes substantially vertically and cause the closures to enter the recesses.

The apparatus of the described type is therefore operatively very slow and necessarily has considerable dimensions and a considerable number of recesses in order to increase the statistical probability of the entry of the closures into said recesses.

Furthermore, if the tubes of closures fed at random to the described apparatus become entangled, as frequently occurs, said apparatus is unable to disentangle them so as to allow regular feeding of the closures to the closure-fitting unit, and said closures remain on the rotary disk-like conveyor and negatively affect the entry of the other closures into said recesses.

SUMMARY OF THE INVENTION

The aim of the present invention is therefore to provide an apparatus of the described type which does not have the disadvantages described with reference to the known art. Within this aim, an object of the invention is to provide an apparatus for feeding closures equipped with a tube to an operating unit, which is capable of feeding to a closure-fitting unit a considerable amount of correctly arranged closures in the unit time.

According to the present invention, this aim and object, as well as other objects which will become apparent hereinafter are achieved by an apparatus for feeding closures provided with a tube to an operating unit which is characterized in that it comprises a disk-like body with a substantially vertical axis, motor means for rotating said disk-like body with a set speed, and wall means which peripherally delimit said disk-like body; said disk-like body comprising a substantially circular wall for supporting said closures, said wall being permeable to air at least at an outer annular portion, said disk-like body being provided with a peripheral annular track which is defined externally by said wall means and is adapted to accommodate said closures arranged with said tubes directed upward; pump means being provided and being arranged below said supporting wall, said means being adapted to direct toward said at least one portion of the lower surface of said supporting wall a jet of air with a substantially vertical direction, said wall means furthermore defining a passage for the exit of said closures arranged within said peripheral annular track.

BRIEF DESCRIPTION OF THE DRAWINGS

The present invention is now described with reference to the accompanying drawings, which illustrate a non-limitative embodiment thereof wherein.

DESCRIPTION OF THE PREFERRED EMBODIMENTS

Figure 1:
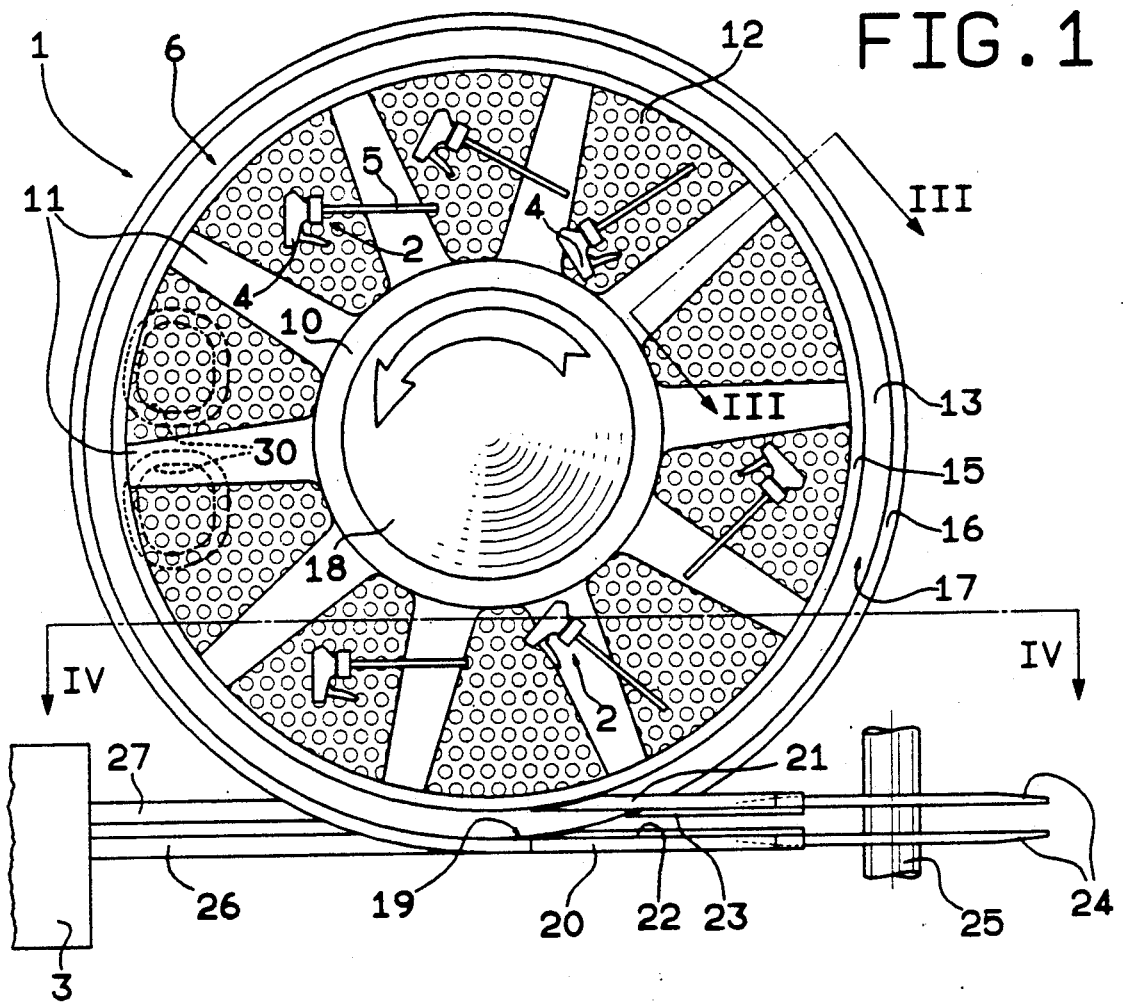
FIG. 1 is a schematic plan view of an apparatus executed according to the teachings of the present invention.
Figure 2:
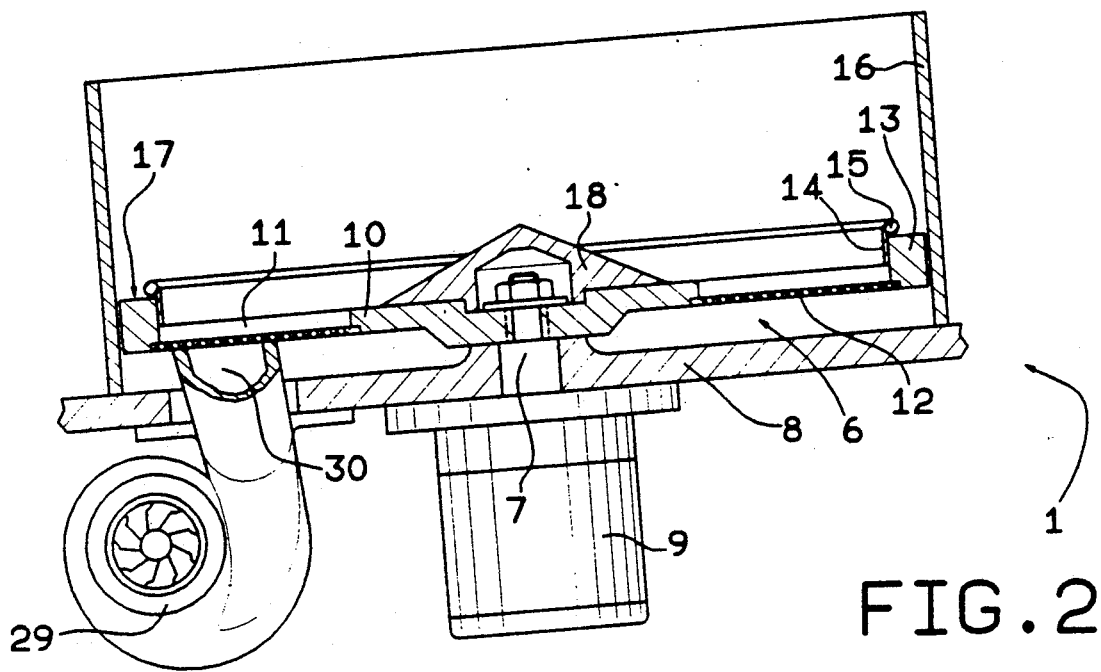
FIG. 2 is a partially sectional schematic elevation view of the apparatus of FIG. 1.

With reference to FIGS. 1 and 2, the reference numeral 1 generally indicates an apparatus for feeding closures 2 to an operating unit 3 constituted by a machine for filling containers (not illustrated) with liquid substances.

Figure 4:
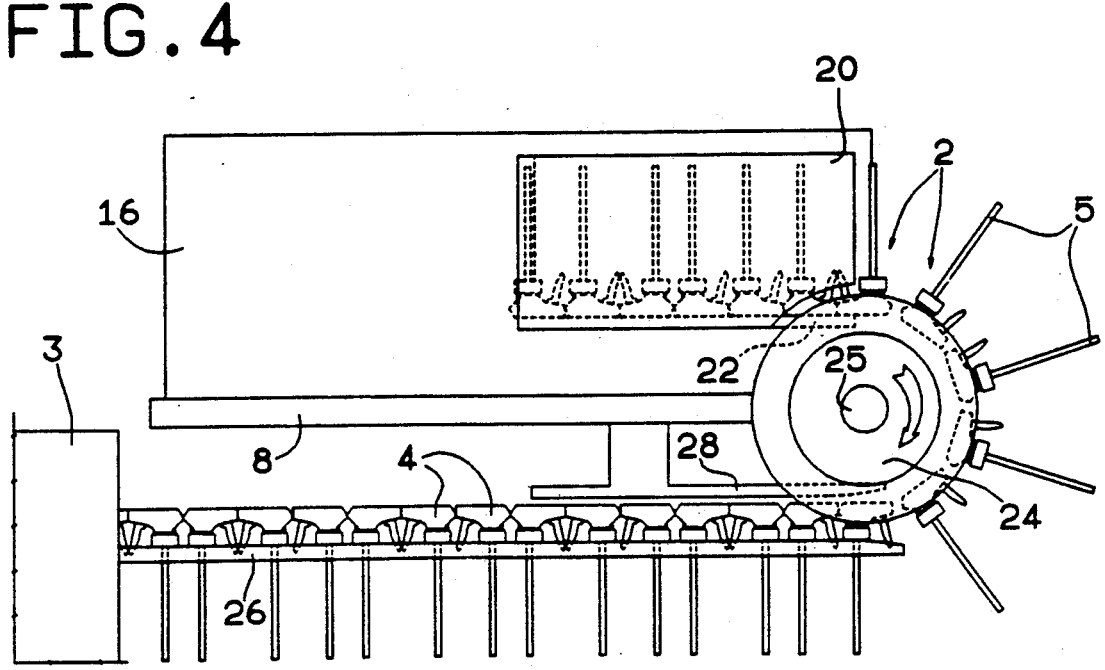
FIG. 4 is a view of a further detail of the apparatus of FIGS. 1 and 2, taken along the line IV—IV of FIG. 1, with some details removed for the sake of clarity.

According to what is illustrated in particular in FIG. 4, each closure 2 comprises a dispenser device 4 adapted to be fixed, for example by screwing, onto the mouth of a related container, and a tube 5 which is connected to the dispenser device 4 and is adapted to be inserted in said container to draw the liquid substance when the container is used and feed said substance to the dispenser device 4.

The apparatus 1 comprises a disk-like body 6 with a substantially vertical axis which is keyed coaxially onto a shaft 7, is rotatably supported by a base 8 and is provided with a counterclockwise rotary motion (FIG. 1) by motor means schematically indicated by a block 9.

The disk-like body 6 comprises a central disk 10 which is keyed on the shaft 7 and from which mutually identical and equidistant spokes 11 extend radially outward and support, in a downward position, a circular table or wall 12 which is permeable to air and is constituted for example by wire netting or perforated metal plate.

Figure 3:
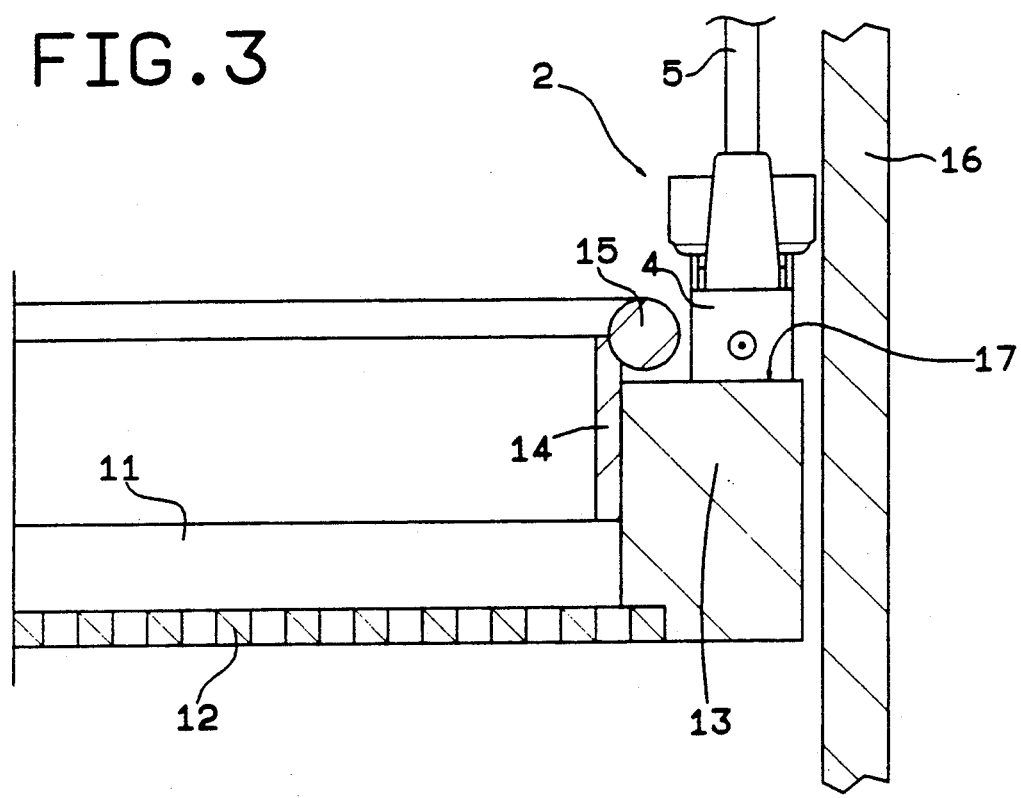
FIG. 3 is a sectional view, taken along the line III—III of FIG. 1, of a detail of the apparatus of FIGS. 1 and 2.

The free ends of the spokes 11 flank the peripheral region of the circular table 12 and are connected (see also FIG. 3) to an annular element 13 which is coaxial to the central disk 10 and has a thickness, measured along a direction which is parallel to the axis of the disk-like body 6, which exceeds that of the spokes 11, so that the upper surface of the annular element 13 is arranged at a higher level than that of the upper surface of the spokes 11 and of the circular table 12.

A cylindrical ring 14 is fixed coaxially to the radially internal surface of the annular element 13 above the spokes 11, and one of its upper edges is arranged at a higher level than the upper surface of said annular element 13. A ring 15 with a circular cross section is coaxially fixed to the radially external surface of said ring 14 above the upper surface of the annular element 13 so as to adhere to said surface, and defines, together with a wall means, constituted by a fixed hollow cylindrical body 16 arranged adjacent to the peripheral region of the disk-like body 6 and coaxial to the annular element 13, a peripheral annular track or circular passage 17 which is adapted to be traversed, as will become apparent hereinafter, by the closures 2.

A conical body 18 is coaxially connected to the upper face of the central disk 10 and is arranged so that the peripheral region of its base is adjacent to the ends of the spokes 11 which are fixed to said central disk 10.

According to what is illustrated in FIG. 1, the hollow cylindrical body 16 has a substantially vertical passage or opening 19 which traverses it along its entire elevation. An edge of said opening 19, arranged upstream with respect to the direction of rotation of the disk-like body 6, is rigidly associated with an edge of a vertical wall 20 which is arranged substantially tangential to the hollow cylindrical body 16. A second vertical wall 21, parallel to the wall 20, is connected, by means of an intermediate portion, to the other edge of the opening 19, and one of its portions is arranged inside the hollow cylindrical body 16 and is superimposed without contact onto the annular element 13.

Respective rails or guiding elements 22 and 23 are rigidly associated with the lower edges of the walls 20 and 21, according to what is illustrated in particular in FIGS. 1 and 4, and are parallel to said edges.

Said guiding elements 22 and 23 flank, with their free ends, respective disks or conveyor means 24 which have a horizontal axis and are keyed onto a shaft 25 which is rotated counterclockwise (FIG. 4) by motor means which are not illustrated.

The two disks 24 are at least partially covered, at their mutually facing faces, with resilient material (not illustrated), and are spaced from one another by a distance which under-approximates a transverse dimension of the closures 2.

The ends of two rails or guiding elements 26 and 27 which lie below the rails 22 and 23 and are parallel thereto are arranged below the disks 24; said guiding elements 26 and 27 end in a manner which is not illustrated at an input station of the filling machine 3. A contrast element 28 is arranged above the passage comprised between the guiding elements 26 and 27 and is constituted by a bar which is horizontal and parallel to said guiding elements 26 and 27. Said contrast element 28 has a end arranged between the disks 24 and is spaced from the guiding elements 26 and 27 by a distance which is preferably slightly greater than the height of the closures 2.

A fixed pump means 29 is provided below the circular table 12 and is suitable for directing a jet of air along a substantially vertical direction by means of duct means, which in the example illustrated in FIG. 1 is constituted by two ducts 30, toward a portion of the lower wall of said circular table 12 which is arranged, with reference to the direction of rotation of the disk-like body 6, upstream to the opening 19 of the hollow cylindrical body 16 by a set angle (substantially 90° in FIG. 1). At least some of the ducts 30 can have their axes slightly inclined with respect to the vertical so as to direct the air upward and toward the peripheral region of the disk-like body 6. According to a preferred embodiment of the apparatus 1, the axis of the disk-like body 6 is furthermore slightly inclined with respect to the vertical, so that said disk-like body 6 keep its own portion which is adjacent to the ends of the ducts 30 slightly lower than its own diametrically opposite portion.

In use, the closures 2 provided with a tube 5 are unloaded at random onto the conical body 18 and fall onto the surface of the circular table 12. Under the action of centrifugal force, the closures 2 progressively move toward the peripheral region of the circular table 12 and reach, during the rotation of the disk-like body 6, the region in which the ducts 30 blow air through the surface of said circular table 12.

At said region, the tubes 5 of the closures 2, which are lighter than the dispenser devices 4, are more strongly affected by the effects of the rising air current and rise so as to become arranged substantially vertical. The flow of air through the ducts 30 has such a force as to lift the closures 2 from the surface of the circular table 12, so that said closures 2, under the effect of the centrifugal force and by virtue of the described inclination of the ducts 30 and of the axis of the disk-like body 6, move into contact with the hollow cylindrical body 16. The closures 2 thus fall into the circular passage 17, always keeping the described arrangement, with their own dispenser devices 4 arranged within said circular passage 17 and in contact with the upper surface of the annular element 13 and with the tubes 5 arranged substantially vertical above the dispenser devices 4.

While the closures 2 maintain the described arrangement due to the centrifugal force to which they are subjected, the closures 2 equipped with a tube are then advanced, by being conveyed by the annular element 13, toward the opening 19, at which they are deflected by the walls 20 and 21 and caused to slide on the guiding elements 22 and 23 until they engage the space comprised between the upper portions of the disks 24 (FIG. 4).

The disks 24, by means of their inner surfaces covered with resilient material, grip the closures 2 and guide them above the guiding elements 26 and 27 by virtue of the co-operation of the contrast element 28, which removes the closures 2 from said disks 24.

The closures 2 are then advanced toward the filling machine 3 by pushing one another and sliding on the guiding elements 26 and 27 or by being conveyed by chains or conveyor belts which are not illustrated.

Figure 5:
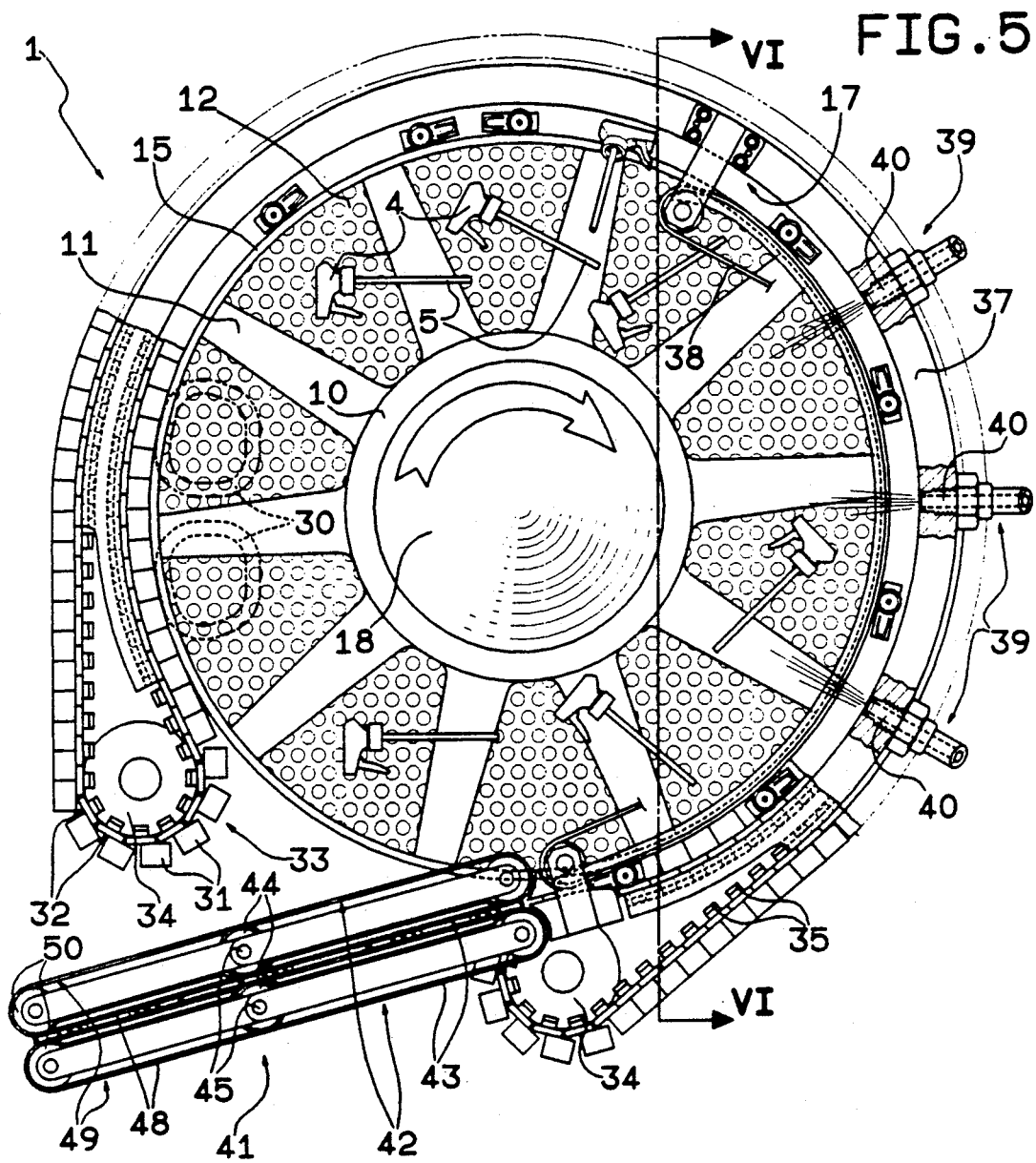
FIG. 5 is a schematic plan view of another embodiment of the apparatus of FIG. 1.
Figure 6:
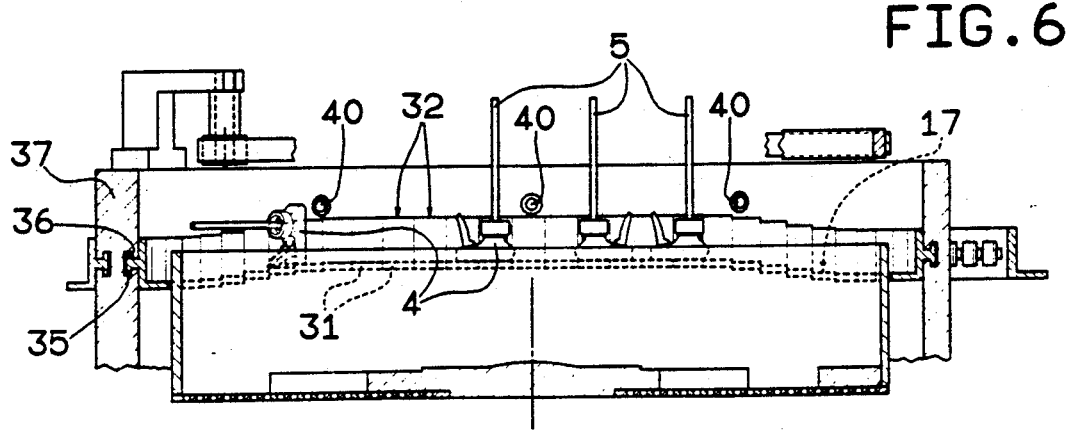
FIG. 6 is a sectional view, taken along the line VI—VI of FIG. 5, of a detail of the apparatus of said FIG. 5.
Figure 7:
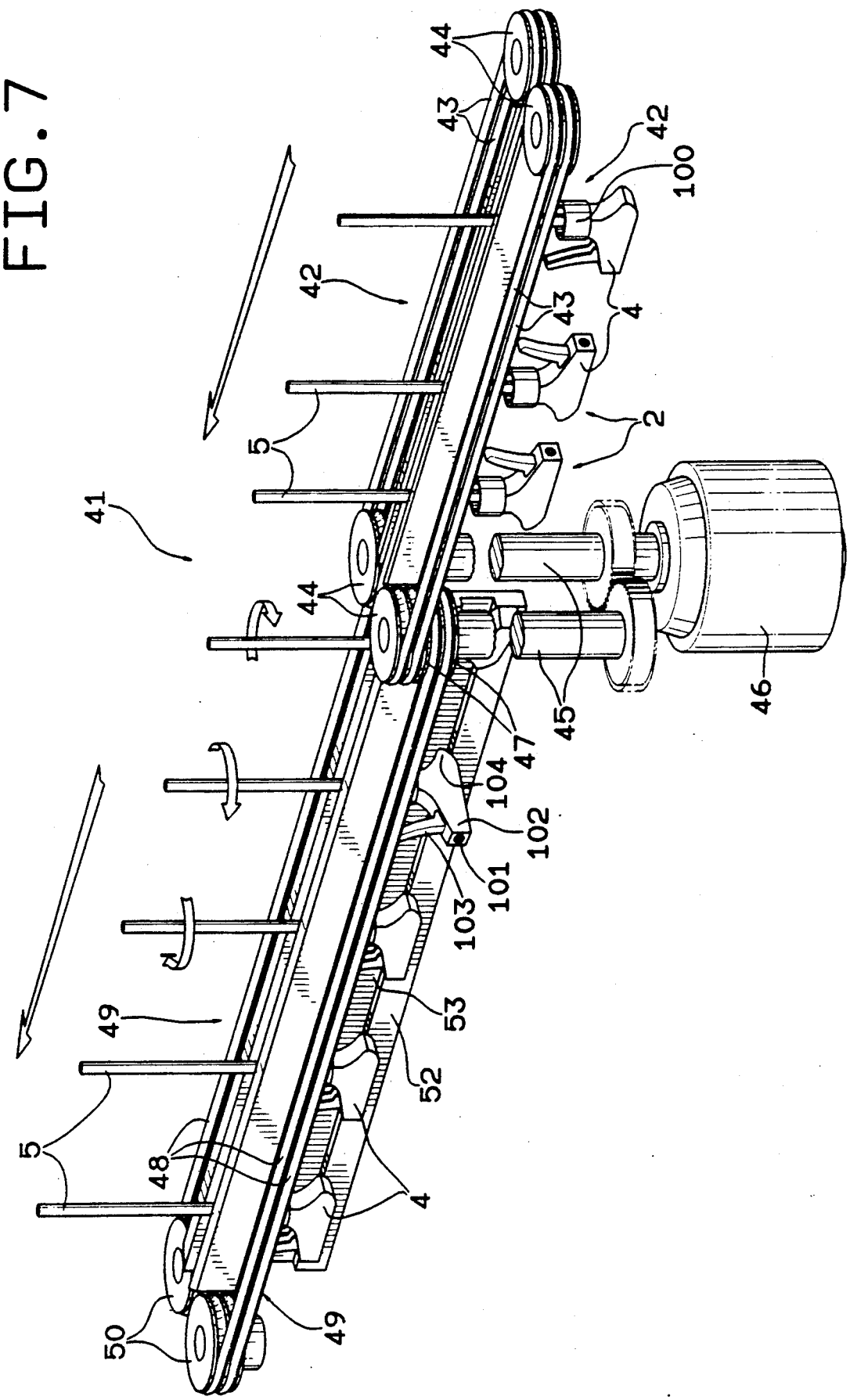
FIG. 7 is a perspective view of a detail of FIG. 5.

According to a variation of the present invention, illustrated in FIGS. 5 to 7, the annular element 13 is not provided and the cylindrical ring 14 is fixed directly to the free ends of the spokes 11. The closures 2 which, according to the already described methods, have passed beyond the ring 15 to enter the circular passage 17, are supported, while they are arranged within said annular passage 17, by plates 31 which are arranged on a horizontal plane and are connected to respective links 32 of a chain conveyor or conveyor means 33. Said chain conveyor 33 is wrapped in a loop around two rollers 34 with a vertical axis, at least one of which is motorized in a manner which is not illustrated, and laterally flanks the cylindrical ring 14 along an arc which is substantially equal to 270° measured clockwise starting from a region adjacent to said ducts 30 so as to define said circular passage 17 with its links 32 and its plates 31 and together with said cylindrical ring 14. Each link 32 supports, inside the ring defined by the conveyor 33, a slider 35 which is slidably engaged, at least within the portion of conveyor 33 which flanks the cylindrical ring 14, within a groove 36 which is defined in a curved plate 37 which is fixed and coaxial to the circular table 12 and is adjacent to the inner side of the branch of the conveyor 33 which is adjacent to said cylindrical ring 14. The sliders 35 and the groove 36 which as mentioned determines the movement of the chain conveyor 33 during its advancement are also defined hereinafter as deflector means for said chain conveyor 33.

A guiding means which comprises a belt or chain conveyor 38, which might also be replaced with a fixed guide, is arranged above the radially internal side of the circular passage 17 in a portion of said passage 17 which is comprised between an intermediate region of the conveyor 33 and the terminal portion of said conveyor 33 with respect to the direction of rotation of the circular table 12.

According to what is illustrated in particular in FIG. 6, the chain conveyor 33 is deformable along a direction which is parallel to the axis of the disk-like body 6, and the groove 36 is shaped so as to produce the lifting of a portion of said conveyor 33 which is adjacent to a portion of the passage 17 which extends substantially along an arc of 90° measured clockwise (FIG. 5) starting from said intermediate region of the conveyor 33. Due to this lifting, which leads to the lifting of the plates 31, the height of the passage 17 at said arc is considerably reduced.

The curved plate 37 supports three ejector devices 39 which are distributed with an uniform pitch along said arc of 90° above the conveyor 33; each ejector device comprises a nozzle 40 which is connected to a source of compressed air which is not illustrated. The line of action of said nozzles 40 is slightly inclined downward and toward the axis of the disk-like body 6.

A device 41 for unloading the closures 2 from the passage 17, which is also defined hereinafter as conveyor means, is arranged substantially adjacent to said passage 17 at the terminal ends of the chain conveyor 33 and the belt conveyor 38.

In order to facilitate the description which follows, the configuration of the closures 2 which the unloading device 41 described hereinafter is capable of processing is explained in greater detail.

According to what can be seen in particular in FIG. 7, each closure 2 comprises a cup-like body 100 which is internally threaded and adapted to be screwed onto the mouth of the container to which said closure 2 is to be applied. The cup-like body 100 coaxially supports inside it an end of a tube 5, and a dispenser device 4 is connected to said body on the opposite side with respect to the side of the tube 5.

Said dispenser device 4 essentially comprises a dispenser nozzle 101, defined in a protrusion 102 which extends from the cup-like body 100 along a direction which is normal to the axis of the tube 5, and a trigger actuation device 103 which is associated with said protrusion 102. The dispenser device 4 furthermore comprises a protrusion 104 which is arranged on the opposite side of the protrusion 102 with respect to the cup-like body 100 and has radial dimensions, with respect to the tube 5, which are slightly smaller than the dimensions of the protrusion 102.

According to what is illustrated in particular in FIGS. 5 and 7, the unloading device 41 comprises two endless conveyors 42 which are arranged facing one another with a rectilinear portion; each conveyor comprises a pair of belts 43 which are superimposed and entrained in a loop around respective pulleys 44 which are supported by vertical shafts 45 (only two of which are illustrated in FIG. 7) which are driven with opposite directions of rotation by motor means 46. The thickness of the passage between the two pairs of belts 43 underapproximates the diameter of the tubes 5, and the pulleys 44 impart to all of the belts 43 an equal advancement speed.

The shafts 45 supporting the pulleys 44 that are most distant from the terminal end of the conveyor 33 also support respective pairs of pulleys 47 around which belts 48 are entrained, which define two endless conveyors 49. Said conveyors 49 are similar in their configuration to the conveyors 42, of which they essentially constitute a continuation, and the belts 48 are also wrapped around respective pulleys 50 supported by vertical shafts which are not illustrated.

The pulleys 44, 47 and 50 all have the same angular speed, and the pulleys 47 and 50 related to the pair of belts 48 which is adjacent to the input end of the chain conveyor 33 have grooves, the diameter whereof is smaller than that of the other pulleys 50. Consequently, the upper belts 48 of FIG. 5 move at a lower speed than the lower belts 48.

A vertical wall 52 which is parallel to the direction of extension of the conveyors 42 and 49 is arranged below the conveyance branches of the belts 48 which are adjacent to the input end of the chain conveyor 33, and is provided, for reasons which will become apparent hereinafter, with a horizontal groove 53 on its face directed toward the passage defined between the two pairs of belts 48.

In use, the closures 2 provided with a tube 5 are guided, in the manner described above, into the circular passage 17 and become arranged so that their own dispenser devices 4 rest on the plates 31 of the chain conveyor 33 and so that the tubes 5 are directed upward.

When said closures 2 reach the region of the conveyor 33 at which the links 32 lift under the action of the sliders 35, the closures 2 which are arranged correctly with their tubes 5 vertical within the passage 17 continue to advance and are kept in the correct position by the belt conveyor 38, whereas any closures 2 which, according to what is shown in FIG. 6, may have entered the passage 17 while they are arranged incorrectly, are pushed onto the circular table 12 when they reach the range of action of the ejection devices 29. By means of a jet of compressed air, said ejection devices 29 are in fact capable, of causing the exit from the passage 17 of any closures 2 which are not retained within said passage 17 by the belt conveyor 38.

The closures 2 which are arranged correctly move along the passage 17 until they reach the output ends of the conveyors 33 and 38 and, according to what is illustrated in particular in FIG. 7, as they exit from the passage 17 they are caused to become arranged so that their respective tubes 5 are trapped between the two pairs of belts 43 of the unloading device 41.

The belts 43 guide the tubes 5 to enter the passage defined by the two pairs of belts 48 which as mentioned are driven with different speeds.

Due to said different speeds, a torque (in a clockwise direction according to FIG. 5) is imparted to the tubes 5 by friction and has no effect on the closures 2 which are arranged (see FIG. 7) so that their related protrusions 102 have the dispenser nozzle 101 already directed toward the output end of the conveyors 49, since said protrusions 102, due to their dimensions, cannot rotate about the axes of the related tubes 5 and pass within the groove 53. Said torque instead produces a 90° clockwise rotation about the axis of the related tubes 5 of all the closures 2 the dispenser nozzle 101 whereof is directed toward the input end of said conveyors 49. Said rotation can occur since the protrusions 104, by virtue of their reduced dimensions, can move along the groove 53 without hindrance when the tubes 5 are subjected to said torque.

The described rotation of the closures 2 arranged so that the dispenser nozzle is directed toward the input end of the conveyors 49 ends when said closures 2 have moved so that their related protrusions 102 are directed toward the output of the unloading device 41 and rest against the wall 52.

At the output of the conveyors 49 the closures 2 are therefore all directed in the same manner, and can be overturned, with their tubes 5 directed downward, by means of known helical guides which are not illustrated, and can then be conveyed toward the filling machine 3.

From what has been described it is evident that the described apparatus is capable of overcoming the disadvantages described with reference to the known art, since it can operate with a considerable operating speed and has reduced dimensions with respect to known described apparatuses. Possible entanglings of tubes 5, related to closures 2 fed in at random over the disk-like body 6, are furthermore easily eliminated by virtue of the rapid movements of said closures 2 due to the flow of air through the ducts 30.

Though the concept of the invention is invariant, the variations which could be applied to the described apparatus without abandoning the scope of the present invention are naturally numerous.

The pump means 29 may be replaced with a plurality of similar pump means, or may lead to a number of ducts which differs from the described one, in order to feed air below any convenient region of the circular table 12.

The spokes 11 have the exclusive function of connecting the annular element 13 to the central disk 10 and of supporting the circular table 12, and can therefore be provided in any number and in any shape and dimensions.

The conical body may furthermore be missing or be replaced with any equivalent element suitable for sorting the closures 2 toward the peripheral region of the circular table 12.

The circular passage 17 may furthermore have, in cross section, any shape which differs from the one illustrated by way of example.

We claim:

1. Apparatus for feeding closures provided with a tube to an operating machine, comprising a disk-like body which has a substantially vertical axis, motor means for rotating said disk-like body with a set speed, and wall means which peripherally delimit said disk-like element, said disk-like body comprising a substantially circular wall for supporting said closures, said wall being permeable to air at least at an outer annular portion thereof and being provided with a peripheral annular track which is defined externally by said wall means and is adapted to accommodate said closures arranged with said tubes directed upward, pump means being provided and arranged below said supporting wall, said pump means being adapted to direct toward at least one portion of the lower surface of said supporting wall a jet of air with a substantially vertical direction, said wall means defining a passage for the exit of said closures which are arranged within said peripheral annular track.

2. Apparatus according to claim 1, comprising a conical body which is substantially coaxial to said disk-like body and is rigidly associated, by means of its own base, with a central portion of the upper surface of said disk-like body.

3. Apparatus according to claim 1, wherein said passage defined by said wall means is connected to conveyor means adapted to guide said closures to said operating unit.

4. Apparatus according to claim 1, wherein said pump means is adapted to direct air toward a portion of the lower surface of said supporting wall which is arranged, with reference to the direction of rotation of said disk-like body, upstream with respect to said output passage defined by said wall means.

5. Apparatus according to claim 4, wherein said pump means directs air toward said portion of the lower surface of said supporting wall by means of at least one substantially vertical duct which has an output port adjacent to said portion of surface.

6. Apparatus according to claim 4, wherein said pump means directs air toward said portion of the lower surface of said supporting wall by means of at least one substantially vertical duct which has an output port adjacent to said portion of surface, and wherein at least one of said ducts is inclined with respect to the vertical so as to direct air toward said portion of surface with a component of motion which is directed toward said peripheral annular track.

7. Apparatus according to claim 1, wherein said disk-like body comprises a central disk which is keyed on a shaft which is inclined by a preset angle with respect to the vertical and is connected to said motor means, said central disk peripherally supporting a plurality of substantially horizontal radial spokes, said disk-like body comprising an annular element which is coaxial thereto and is supported by the free ends of said spokes, said spokes supporting said supporting wall, and said peripheral annular track being defined in an upper portion of said annular element and having a substantially horizontal resting surface arranged at a higher level with respect to the level of the upper surface of said supporting wall.

8. Apparatus according to claim 1, wherein said wall means comprise conveyor means which define both the bottom and the peripheral surface of said peripheral annular track.

9. Apparatus according to claim 8, wherein said conveyor means comprise a chain conveyor.

10. Apparatus according to claim 9, wherein said conveyor means comprises a chain conveyor, and wherein said chain conveyor is deformable along a direction which is parallel to the axis of said disk-like body, deflector means being provided to produce, along a portion of preset length of said peripheral annular track, an upward sliding of a portion of said chain conveyor along a direction which is parallel to said axis.

11. Apparatus according to claim 1, further comprising ejection means arranged along said portion of said peripheral annular track so as to extract from said peripheral annular track any closures arranged incorrectly.

12. Apparatus according to claim 11, wherein said ejection means comprise pneumatic means.

13. Apparatus according to claim 1, further comprising means for guiding the tubes related to the closures contained within said peripheral annular track, said means being adjacent to a radially internal region of a portion of said peripheral annular track.

14. Apparatus according to claim 8, wherein said conveyor means adapted to guide said closures to said operating unit comprise at least two mutually facing endless conveyors which define between them a passage the width whereof under-approximates the diameter of said tubes, the advancement speed of one of said endless conveyors exceeding the advancement speed of the other.

* * * * *